United States Patent
Morris

(10) Patent No.: US 8,126,934 B2
(45) Date of Patent: Feb. 28, 2012

(54) UPDATING TRACK DATABASES AFTER TRACK MAINTENANCE

(75) Inventor: Charles W. Morris, Manassas, VA (US)

(73) Assignee: Lockheed Martin Corporation, Bethesda, MD (US)

(*) Notice: Subject to any disclaimer, the term of this patent is extended or adjusted under 35 U.S.C. 154(b) by 340 days.

(21) Appl. No.: 12/402,695

(22) Filed: Mar. 12, 2009

(65) Prior Publication Data
US 2010/0235405 A1   Sep. 16, 2010

(51) Int. Cl.
*G06F 7/00* (2006.01)
*G06F 17/30* (2006.01)

(52) U.S. Cl. .................................. 707/803; 701/19

(58) Field of Classification Search .......... 707/600–831; 701/19, 23, 200, 207, 208, 213–215, 301; 340/901–907
See application file for complete search history.

(56) References Cited

U.S. PATENT DOCUMENTS

| | | | |
|---|---|---|---|
| 5,893,043 A | 4/1999 | Moehlenbrink et al. | |
| 6,029,173 A | 2/2000 | Meek et al. | |
| 6,218,961 B1 | 4/2001 | Gross et al. | |
| 6,434,452 B1 | 8/2002 | Gray | |
| 6,641,090 B2* | 11/2003 | Meyer | 246/122 R |
| 6,728,708 B1 | 4/2004 | Yotka et al. | |
| 7,084,882 B1 | 8/2006 | Dorum et al. | |
| 7,142,982 B2* | 11/2006 | Hickenlooper et al. | 701/213 |
| 7,564,994 B1 | 7/2009 | Steinberg et al. | |
| 2002/0072833 A1* | 6/2002 | Gray | 701/19 |
| 2002/0109049 A1 | 8/2002 | Alacoque et al. | |
| 2005/0149255 A1* | 7/2005 | Vogel et al. | 701/207 |
| 2005/0228620 A1* | 10/2005 | Convert et al. | 703/1 |
| 2006/0271291 A1 | 11/2006 | Meyer | |

FOREIGN PATENT DOCUMENTS
EP  0795454 A1  9/1997

OTHER PUBLICATIONS

Weston et al., Condition Monitoring of Railway Track using In-Service Trains, Nov. 29-30, 2006, IEEE, 26-31.*
Stopford, Ross, "AU Application No. 2010200767 Office Action Oct. 6, 2011", , Publisher: IPA, Published in: AU.
Stopford, Ross H., "AU Application No. 2010200767 Office Action Oct. 15, 2010", , Publisher: IPA, Published in: AU.
Kumar, Abhimanyu, "AU Application No. 2010200765 Office Action Feb. 21, 2011", Publisher: IPA, Published in: AU.
Badii, Behrang, "U.S. Appl. No. 12/402,681 Office Action Jun. 28, 2011", Publisher: USPTO, Published in, US.
Kumar, Abhimanyu, "AU Application No. 2010200766 Office Action Feb. 21, 2011", Publisher: IPA, Published in: AU.
Badii, Behrang, "U.S. Appl. No.12/402,681 Office Action Oct. 28, 2011", Publisher: USPTO, Published in: US.
Badii, Behrang, "U.S. Appl. Ser. No. 12/402,706 Office Action Dec. 8, 2011", Publisher USPTO, Published in US.
Stopford, Ross H., "AU Application Number 2010200767 Office Action Dec. 14, 2011", Publisher: IPA, Published in: AU.

* cited by examiner

*Primary Examiner* — Jean B Fleurantin
(74) *Attorney, Agent, or Firm* — DeMont & Breyer, LLC

(57) ABSTRACT

Techniques are disclosed for updating a train track database after track maintenance so that the database correctly reflects any changes to track geometry or to the geo-locations of features along the tracks (e.g., grade crossings, mileposts, signals, platforms, switches, spurs, etc.). Advantageously, the techniques of the illustrative embodiment enable a track maintenance crew to cost-effectively obtain post-maintenance measurements for features without the use of a Global Positioning System (GPS) unit (e.g., using a tape measure, using a laser rangefinder, etc.).

20 Claims, 13 Drawing Sheets

Figure 5

TABLE 401

| 501 X | 502 Y | 503 Z | 504 HEADING | 505 GRADE | 506 CURVATURE | 507 OFFSET |
|---|---|---|---|---|---|---|
| | | | | | | |
| | | | | | | |
| | | | | | | |

Figure 6

TABLE 403-i

| 611-i PROPERTY1 | 612-i PROPERTY2 | 613-i PROPERTY3 |
|---|---|---|
| | | |
| | | |

TABLE 402-i

| 601-i FEATURE ID | 602-i TRACK POINT | 603-i OFFSET |
|---|---|---|
| | | |
| | | |

…

UPDATING TRACK DATABASES AFTER TRACK MAINTENANCE

CROSS-REFERENCE TO RELATED APPLICATIONS

This application is related to U.S. patent application Ser. No. 12/402,681 entitled "Validation of Track Databases" and U.S. patent application Ser. No. 12/402,706 entitled "Database For Efficient Storage of Track Geometry and Feature Locations", both of which were filed on the same day as the present application.

FIELD OF THE INVENTION

The present invention relates to databases in general, and, more particularly, to updating databases that store railroad track geometry and feature location information.

BACKGROUND OF THE INVENTION

In many instances it might be desirable to have a database that captures the geometry of a train track, as well as the geo-locations of various features (e.g., grade crossings, mileposts, signals, platforms, switches, spurs, etc.) along the train track. For example, such a database might be useful in train motion and path-taken navigation algorithms, predictive braking algorithms, and locomotive fuel management algorithms.

SUMMARY OF THE INVENTION

Railroad tracks can undergo maintenance that causes changes in the geo-location of features on the tracks, or in the geometry of the track itself. In addition, track maintenance may involve the addition of new features to a track, or the removal of features from a track.

The present invention provides techniques for updating a track database after maintenance so that the database correctly reflects any changes to tracks or track features. Advantageously, the techniques of the illustrative embodiment enable a track maintenance crew to cost-effectively obtain post-maintenance measurements for features without the use of a Global Positioning System (GPS) unit (e.g., using a tape measure, using a laser rangefinder, etc.).

The illustrative embodiment comprises a method of updating a database that comprises a geometric representation of a train track and a plurality of offsets corresponding to the geo-locations of features on said train track, wherein the method comprises: measuring, without the use of a Global Positioning System unit, a change in the geo-location of a feature F on the train track, wherein the database associates with the feature F a value V for an offset from a point P on the train track; computing a new value V' for the feature F based on the change in the geo-location of the feature F; and storing in the database the new value V' as the offset for the feature F.

BRIEF DESCRIPTION OF THE DRAWINGS

FIG. 5 depicts the structure of table 401, as shown in FIG. 4, in accordance with the illustrative embodiment of the present invention.

FIG. 6 depicts the structure of table 402-$i$, where i is an integer between 1 and N, in accordance with the illustrative embodiment of the present invention.

DETAILED DESCRIPTION

Figure 1:
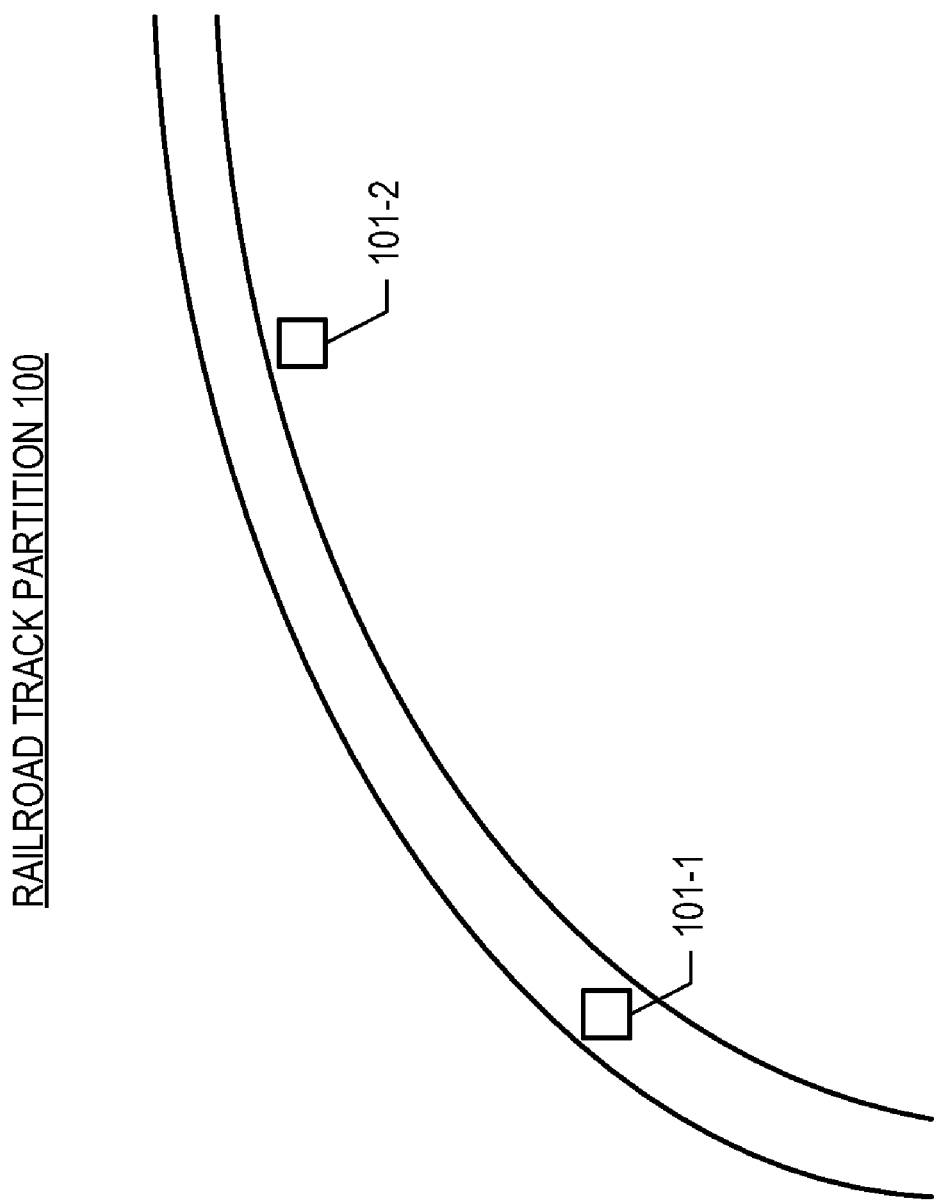
FIG. 1 depicts a segment of illustrative railroad track partition 100 and illustrative features 101-1 and 101-2, in accordance with the illustrative embodiment of the present invention.

FIG. 1 depicts a segment of illustrative railroad track partition 100 and illustrative features 101-1 and 101-2, in accordance with the illustrative embodiment of the present invention. As shown in FIG. 1, a feature might be located either on or abreast railroad track partition 100, depending on the particular type of feature. For example, feature 101-1, which is located on railroad track partition 100, might be a switch, while feature 101-2, which is abreast railroad track partition 100, might be a platform.

Figure 2:
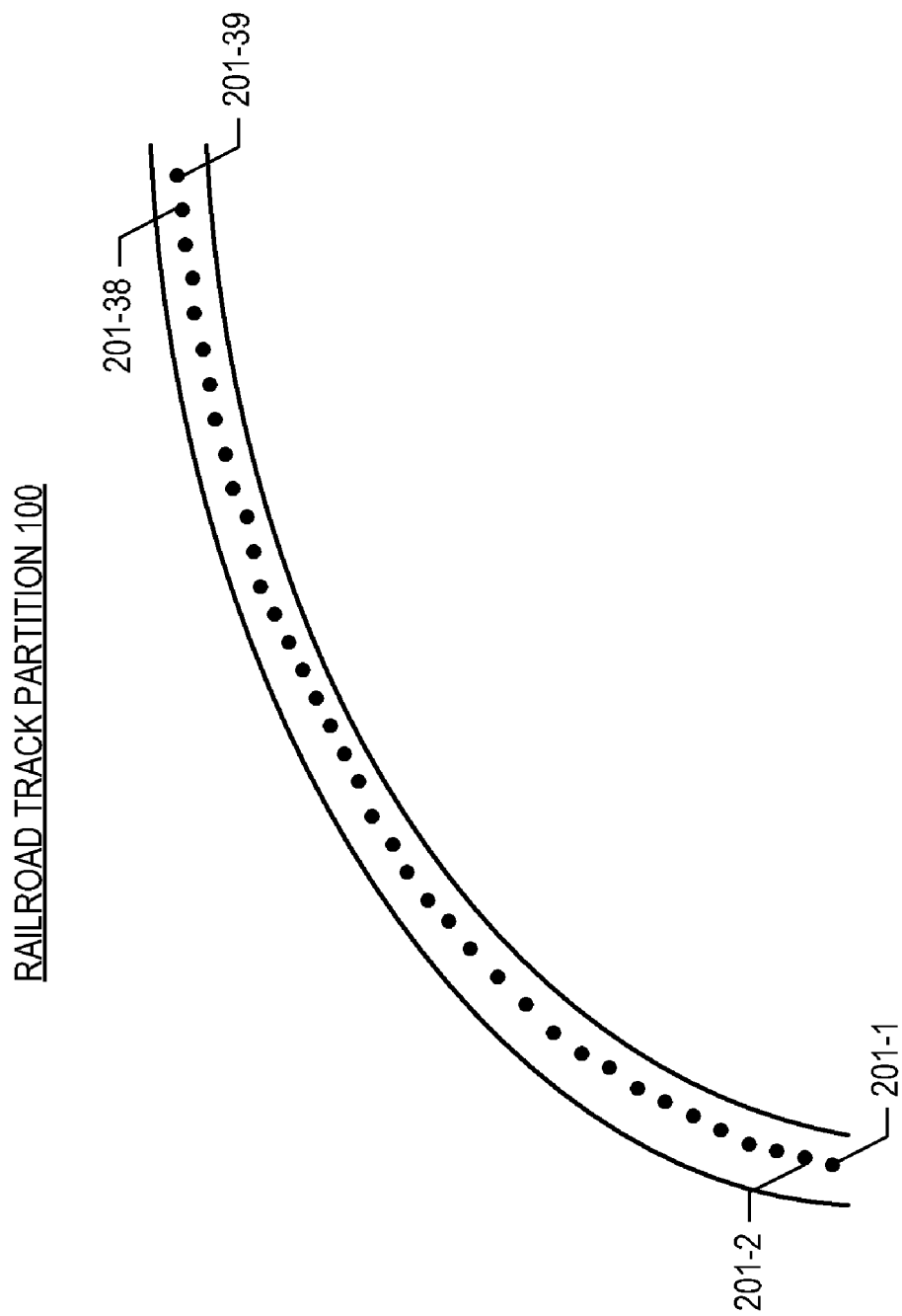
FIG. 2 depicts railroad track partition 100 and illustrative centerline geo-locations 201-1 through 201-39 that are obtained from a survey, in accordance with the illustrative embodiment of the present invention.

FIG. 2 depicts railroad track partition 100 and illustrative centerline geo-locations 201-1 through 201-39 that are obtained from a survey, in accordance with the illustrative embodiment of the present invention. As will be appreciated by those skilled in the art, the fact that there happen to be 39 centerline geo-locations depicted in FIG. 2 is merely illustrative, and does not represent the actual number or spacing of centerline geo-locations obtained in a track survey.

In accordance with the illustrative embodiment, centerline geo-locations 201-1 through 201-39 are expressed in latitude/longitude/altitude, and might be obtained from readings of a Global Positioning System (GPS) unit traveling along railroad track partition 100, from an aerial survey, etc.

Construction of the Database

A key feature of the present invention is the construction of a database of relatively small size that accurately captures track geometry, as opposed to a database that stores all of the track centerline geo-locations, which would require a significantly larger amount of memory.

Figure 3:
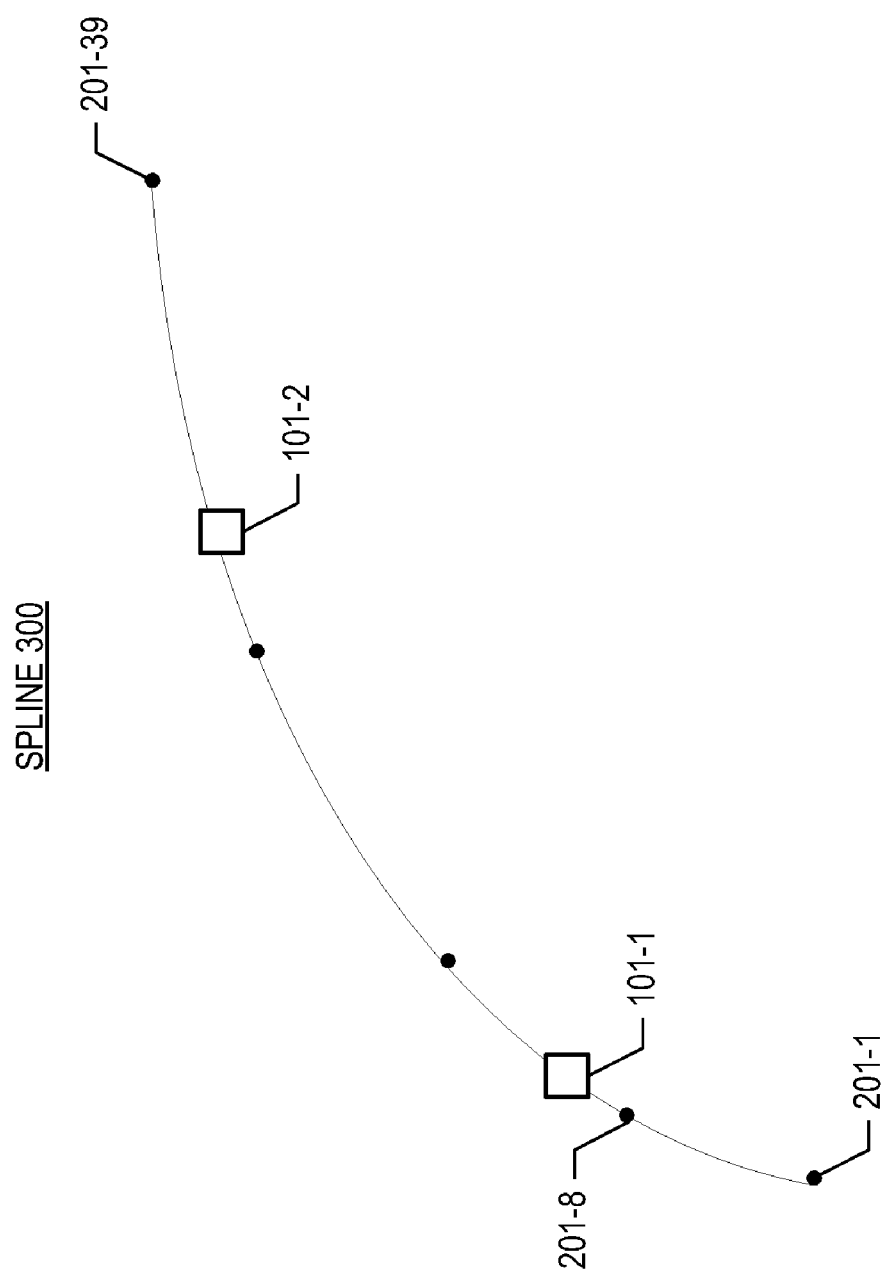
FIG. 3 depicts illustrative piecewise polynomial spline 300 that is fit to a subset of centerline geo-locations 201-1 through 201-39, in accordance with the illustrative embodiment of the present invention.

FIG. 3 depicts illustrative piecewise polynomial spline 300 that is fit to a subset of centerline geo-locations 201-1 through 201-39, in accordance with the illustrative embodiment of the present invention. As shown in FIG. 3, each point of piecewise polynomial spline 300 corresponds to a particular centerline geo-location in this subset (e.g., centerline geo-location 201-1, centerline geo-location 201-39, etc.). The manner in which piecewise polynomial spline 300 is represented and constructed is described in detail below and with respect to FIGS. 7 and 8.

Figure 4:
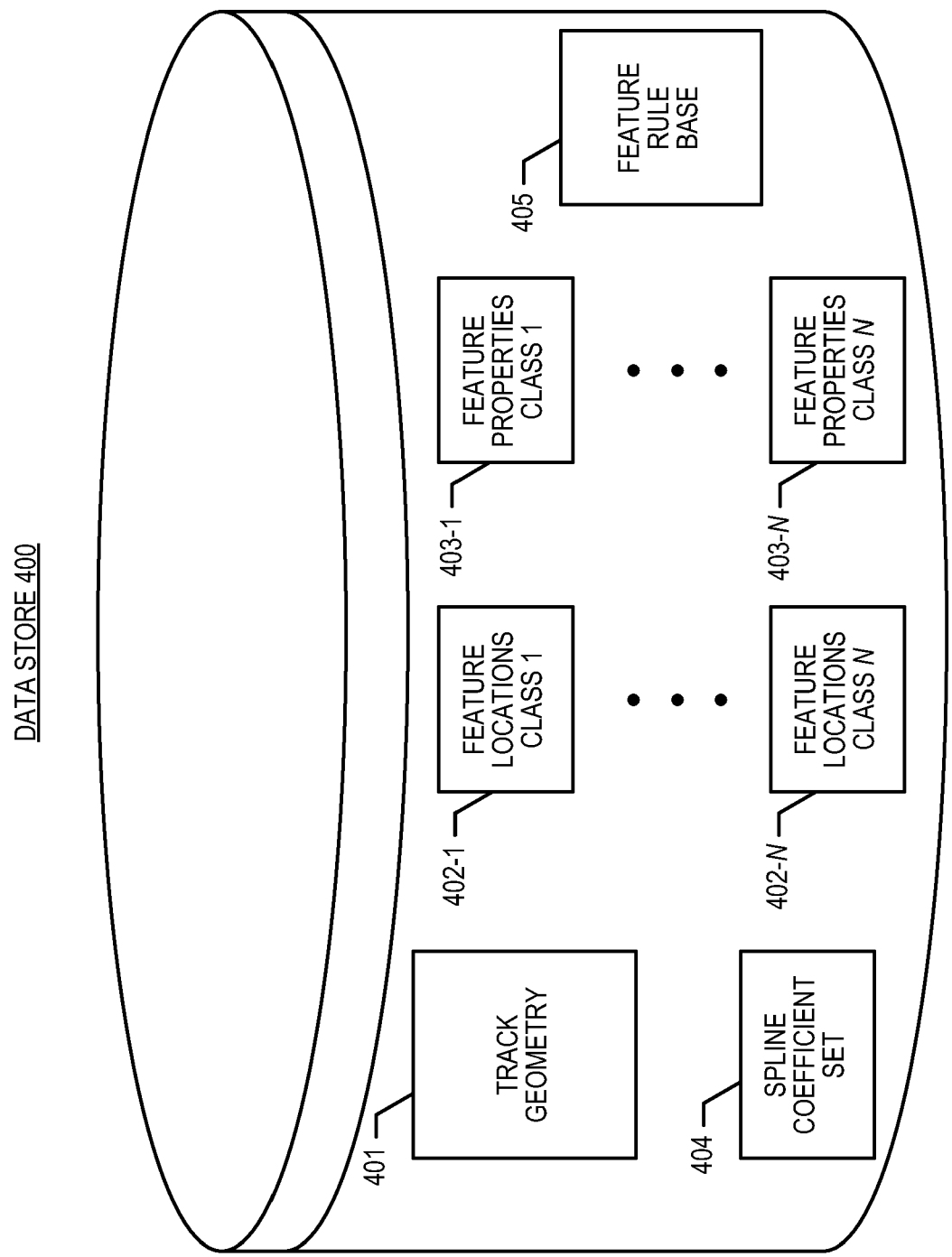
FIG. 4 depicts data store 400 for storing track geometry data and feature locations, in accordance with the illustrative embodiment of the present invention.

FIG. 4 depicts data store 400 for storing track geometry data and feature locations, in accordance with the illustrative embodiment of the present invention. In accordance with the illustrative embodiment, data store 400 is a relational database; as will be appreciated by those skilled in the art, however, some other embodiments of the present invention might employ another kind of data store (e.g., an alternative type of database such as an object-oriented database or a hierarchical database, one or more unstructured "flat" files, etc.), and it will be clear to those skilled in the art, after reading this disclosure, how to make and use such alternative embodiments of data store 400.

As shown in FIG. 4, data store comprises table 401, feature location tables 402-1 through 402-N, where N is a positive integer, feature property tables 403-1 through 403-N, spline coefficient set 404, and feature constraint rule base 405.

Table 401 is a data structure for storing track geometry information, and in particular, data derived from piecewise polynomial spline 300, as described in detail below and with respect to FIG. 5.

Feature location tables 402-1 through 402-N are data structures for storing the locations of features along railroad track partition 100, as described in detail below and with respect to FIG. 6. In accordance with the illustrative embodiment, each feature location table 402-i, where i is an integer between 1 and N inclusive, corresponds to a respective feature class (e.g., mileposts, traffic signals, platforms, etc.), so that, for example, feature location table 402-1 might store the locations of all mileposts along railroad track partition 100, feature location table 402-2 might store the locations of all traffic signals along railroad track partition 100, and so forth. Moreover, in accordance with the illustrative embodiment feature location tables 402-1 through 402-N are organized into physical track locations.

Feature property tables 403-1 through 403-N are data structures for storing properties of features (e.g., enter and exit directions of a switch, a speed limit for a switch, etc.) as described in detail below and with respect to FIG. 6.

Spline coefficient set 404 stores the values of the coefficients of piecewise polynomial spline 300, as is well-known in the art.

Feature rule base 405 comprises one or more rules and/or constraints for the features along railroad track partition 100. In accordance with the illustrative embodiment, feature rule base 405 comprises one or more of the following:

rules/constraints regarding the values of properties of the features (e.g., the speed limit of a switch must be a positive real number less than or equal to 100 miles per hour, etc.);

rules/constraints regarding relationships between property values of a feature (e.g., the enter and exit directions of a switch must be at least 120 degrees apart and no more than 240 degrees apart, etc.);

rules/constraints regarding relationships between property values of two or more features (e.g., the exit direction of a first switch must be within five degrees of the enter direction of a second switch, etc.);

rules/constraints regarding the locations of features; and rules/constraints regarding relationships between locations of two or more features (e.g., the distance between a traffic signal and its associated switch must be at least X meters but at most Y meters, etc.).

As will be appreciated by those skilled in the art, some other embodiments of the present invention might organize the data stored in data store 400 in an alternative manner (e.g., the locations of all types of features might be stored in a single table, etc.), and it will be clear to those skilled in the art, after reading this disclosure, how to make and use such alternative embodiments. Moreover, it will be appreciated by those skilled in the art that in some other embodiments data store 400 might employ alternative types of data structures in lieu of tables (e.g., objects in an object-oriented database, trees in a hierarchical database, etc.), and it will be clear to those skilled in the art, after reading this disclosure, how to make and use such embodiments.

FIG. 5 depicts the structure of table 401 in accordance with the illustrative embodiment of the present invention. Each row in table 401 corresponds to a particular point of piecewise polynomial spline 300, which in turn corresponds to centerline geo-location 201-i that is included in (e.g., 201-1, 201-39, etc.). As shown in FIG. 5, table 401 comprises columns 501 through 507.

Columns 501, 502, and 503 store x, y, and z coordinates, respectively, for each point of piecewise polynomial spline 300. As described below and with respect to FIG. 7, these coordinates are Earth-Centered Earth-Fixed Cartesian coordinates and are derived from the latitude, longitude, and altitude of the corresponding centerline geo-locations.

Columns 504, 505, and 506 store estimates of the heading, grade, and curvature of railroad track partition 100, respectively, at each point of piecewise polynomial spline 300. In accordance with the illustrative embodiment, column 504 stores the heading in degrees, column 505 stores the grade as a percentage, and column 506 represents track curvature in units of degrees/meter.

For the feature offsets, there is no corresponding track point element specifically located at that feature. The feature can lie between two track point elements. For feature offsets, however, one needs to have the corresponding track partition's track point elements (shown in FIG. 5) which do describe the geometry of that section of track.

FIG. 6 depicts the structure of tables 402-i and 403-i, where i is an integer between 1 and N, in accordance with the illustrative embodiment of the present invention. Each row in table 402-i corresponds to a feature of class i (e.g., mileposts, traffic signals, etc.) along railroad track partition 100. As shown in FIG. 6, table 402-i comprises columns 601-i, 602-i, and 603-i. Column 601-i stores an identifier that uniquely identifies each feature; column 602-i stores an indicium of a particular point of piecewise polynomial spline 300 (e.g., its row number in table 401, etc.), and 603-i stores an estimated distance offset from the point specified by column 602-i. In this way, the exact location of each feature can be derived from piecewise polynomial spline 300 and the corresponding entries of columns 602-i and 603-i.

For example, a row in table 402-i for feature 101-1 would specify an indicium of the point corresponding to centerline geo-location 201-8 (which is the point of spline 300 that immediately precedes feature 101-1, as shown in FIG. 3), and an estimated distance offset along railroad track partition 100 from this point (say, 205.3 centimeters). As will be appreciated by those skilled in the art, column 602-i is not required to determine the three-dimensional coordinates of a track-centric feature at a specific offset into the partition. The computations required to recover the geo-location of a feature from the information stored in tables 401 and 402-*i* are described in detail below and with respect to FIG. 8.

Each row in table 403-*i* corresponds to a feature of class i (e.g., mileposts, traffic signals, etc.) along railroad track partition 100. As shown in FIG. 6, table 403-*i* comprises columns 611-*i*, 612-*i*, and 613-*i*, each of which is for storing values of particular properties of the feature. (As will be appreciated by those skilled in the art, the fact that there are three such columns is merely illustrative, and some embodiments might have a smaller or larger number of such columns, or even a different number of such columns for each particular class i.) For example, if class i represents the class of switches, then column 611-*i* might store the enter direction of the switch, column 612-*i* might store the exit direction of the switch, and 613-*i* might store the maximum allowable speed limit for the switch.

Figure 7:
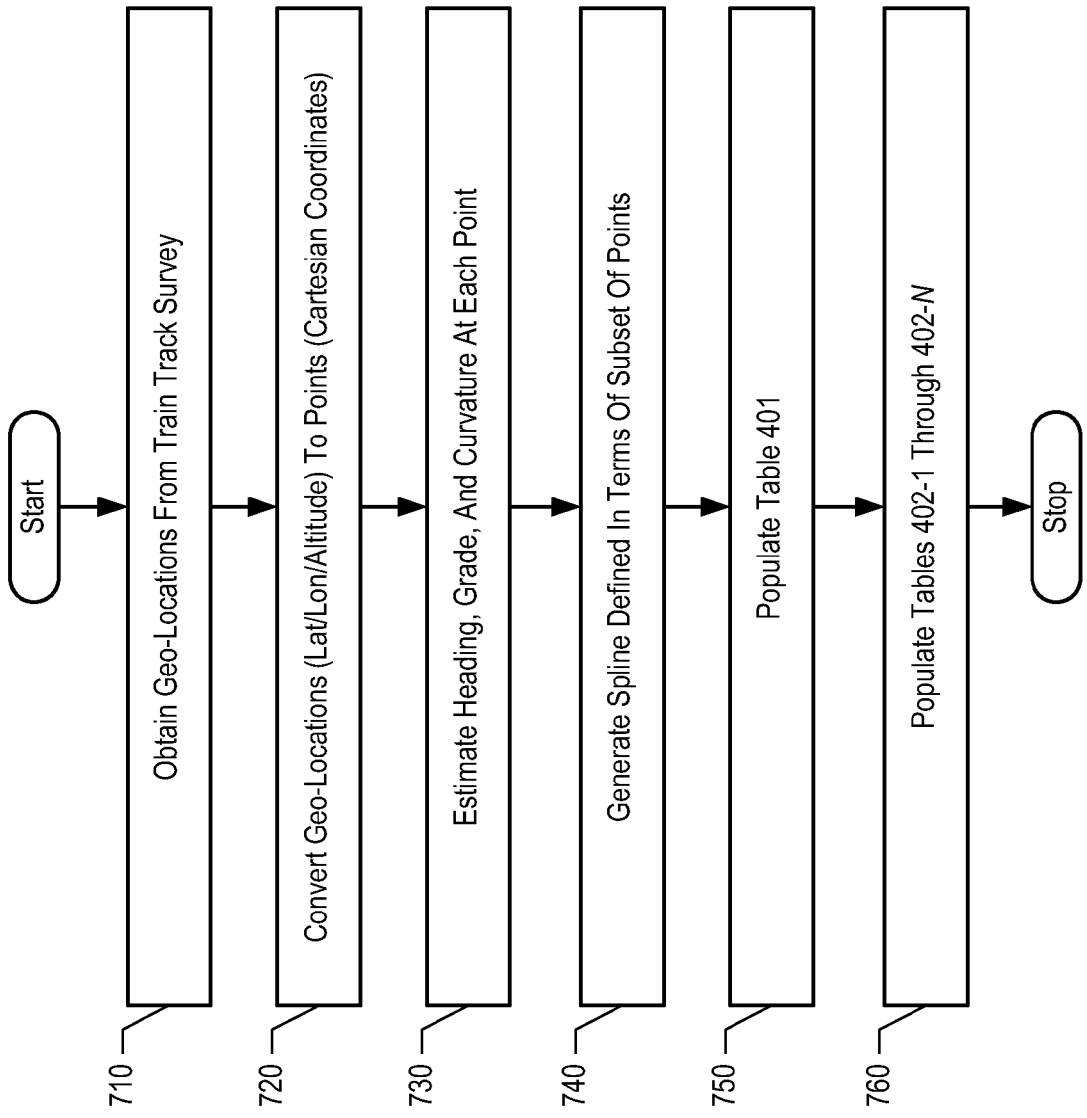
FIG. 7 depicts a flowchart of a method for populating tables 401 and 402-1 through 402-N, in accordance with the illustrative embodiment of the present invention.

FIG. 7 depicts a flowchart of a method for populating tables 401 and 402-1 through 402-N, in accordance with the illustrative embodiment of the present invention. It will be clear to those skilled in the art, after reading this disclosure, which tasks depicted in FIG. 7 can be performed simultaneously or in a different order than that depicted.

At task 710, track centerline geo-locations 201 and feature geo-locations 101 are obtained from a survey of railroad track partition 100.

At task 720, geo-locations 201 are converted from latitude/longitude/altitude to points expressed in Earth-Centered Earth-Fixed Cartesian coordinates, in well-known fashion.

At task 730, the heading, grade, and curvature of railroad track partition 100 are estimated at each of the points determined at task 720, in well-known fashion.

At task 740, piecewise polynomial spline 300 is generated, where the spline is defined in terms of a proper subset of the points determined at task 720.

At task 750, columns 501 through 506 of table 401 are populated with the coordinates and heading/grade/curvature estimates for each of the subset of points determined at task 740. In addition, column 507 is populated with a distance offset from the first point in the table (i.e., the point corresponding to geo-location 201-1), so that the entries in column 507 are monotonically increasing, starting with zero in the first row. The distance offset is particularly useful in determining the locations, extents, magnitude, and nature of horizontal and vertical railroad track curves.

At task 760, tables 402-1 through 402-N are populated with data corresponding to features 101 of railroad track partition 100, where, as described above, each feature corresponds to a row in one of these tables, and the corresponding row comprises: a feature identifier, an indicium of the point on piecewise polynomial spline 300 that immediately precedes the feature, and an estimated distance offset from this point. As will be appreciated by those skilled in the art, the distance offset can be estimated via elementary Calculus from the coordinates of the feature, the coordinates of the preceding point, and the equation of piecewise polynomial spline 300. As mentioned above, the geo-locations of features 101 can be recovered from these data via the method described below and with respect to FIG. 8.

Figure 8:
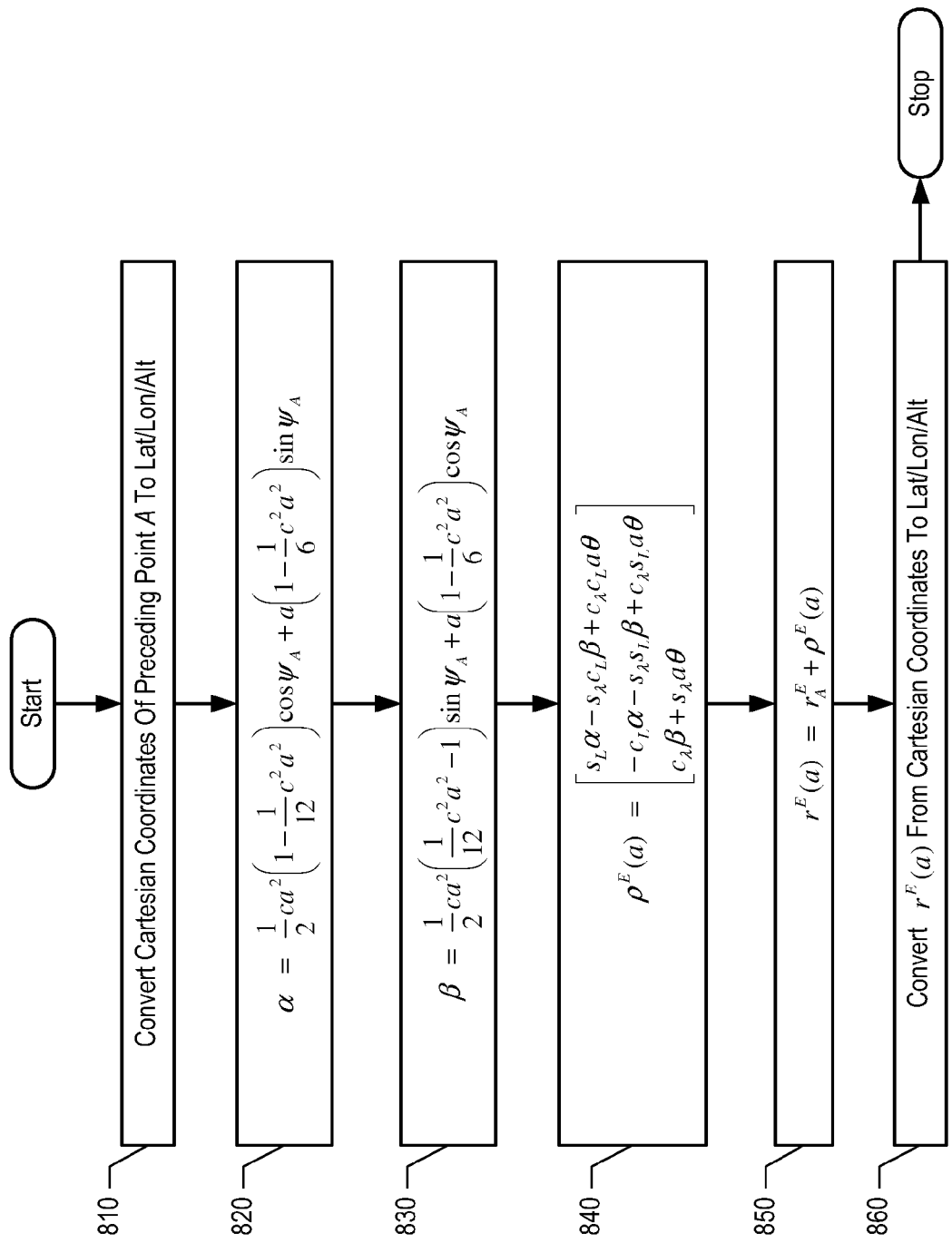
FIG. 8 depicts a flowchart of a method for determining the geo-location of a feature based on the contents of data store 400, in accordance with the illustrative embodiment of the present invention.

FIG. 8 depicts a flowchart of a method for determining the geo-location of a feature based on the contents of data store 400, in accordance with the illustrative embodiment of the present invention. It will be clear to those skilled in the art, after reading this disclosure, which tasks depicted in FIG. 8 can be performed simultaneously or in a different order than that depicted.

At task 810, the Cartesian coordinates of preceding point A on piecewise polynomial spline 300 (i.e., A is the point on spline 300 that immediately precedes the feature) is converted to latitude/longitude/altitude, in well-known fashion.

At task 820, coefficient $\alpha$ is computed using Equation 1:

$$\alpha = \frac{1}{2}ca^2\left(1 - \frac{1}{12}c^2a^2\right)\cos\psi_A + a\left(1 - \frac{1}{6}c^2a^2\right)\sin\psi_A \quad \text{(Eq. 1)}$$

where a is an offset from point A, c is curvature, and $\psi_A$ is the heading at point A.

At task 830, coefficient $\beta$ is computed using Equation 2:

$$\beta = \frac{1}{2}ca^2\left(\frac{1}{12}c^2a^2 - 1\right)\sin\psi_A + a\left(1 - \frac{1}{6}c^2a^2\right)\cos\psi_A \quad \text{(Eq. 2)}$$

At task 840, vector $\underline{\rho}^E(a)$ is computed using Equation 3:

$$\underline{\rho}^E(a) = \begin{bmatrix} s_L\alpha - s_\lambda c_L\beta + c_\lambda c_L a\theta \\ -c_L\alpha - s_\lambda s_L\beta + c_\lambda s_L a\theta \\ c_\lambda\beta + s_\lambda a\theta \end{bmatrix} \quad \text{(Eq. 3)}$$

where $\theta$ is grade, $s_L$ is shorthand for sine(longitude), $s_\lambda$ is shorthand for sine(latitude), $c_L$ is shorthand for cosine(longitude), $c_\lambda$ is shorthand for cosine(latitude), and latitude is geodetic. Vector $\underline{\rho}^E(a)$ is the Earth-Centered Earth-Fixed displacement vector to get to the centerline point at distance a beyond point A.

At task 850, Cartesian coordinate vector $\underline{r}^E(a)$ is computed using Equation 4:

$$\underline{r}^E(a) = \underline{r}_A^E + \underline{\rho}^E(a) \quad \text{(Eq. 4)}$$

where $\underline{r}_A^E$ is the vector of Earth-Centered Earth-Fixed coordinates stored at point A.

At task 860, vector $\underline{r}^E(a)$ is converted from Cartesian coordinates to latitude/longitude/altitude, in well-known fashion. After task 860, the method of FIG. 8 terminates.

Validation of the Database

Once data store 400 has been constructed, the data in data store 400 is validated. In particular, in accordance with the illustrative embodiment of the present invention, the data is validated in two ways: (1) by checking the data for consistency against a geological database, and (2) by checking the data for internal consistency.

In the first case, the geo-locations of features in data store 400 are checked for consistency with the geo-locations of monuments in the geological database, as described below and with respect to FIGS. 9 and 10. In the second case, the locations and property values of features are checked for conformance with feature rule base 405. As will be appreciated by those skilled in the art, there are a variety of ways known in the art by which the contents of tables 402-1 through 402-N and tables 403-1 through 403-N, as well as the contents of table 401 and spline coefficient set 404, can be checked for conformance with the rules/constraints of feature rule base 405 (e.g., via a rule-based expert system shell, via a constraint satisfaction engine, etc.).

Figure 9:
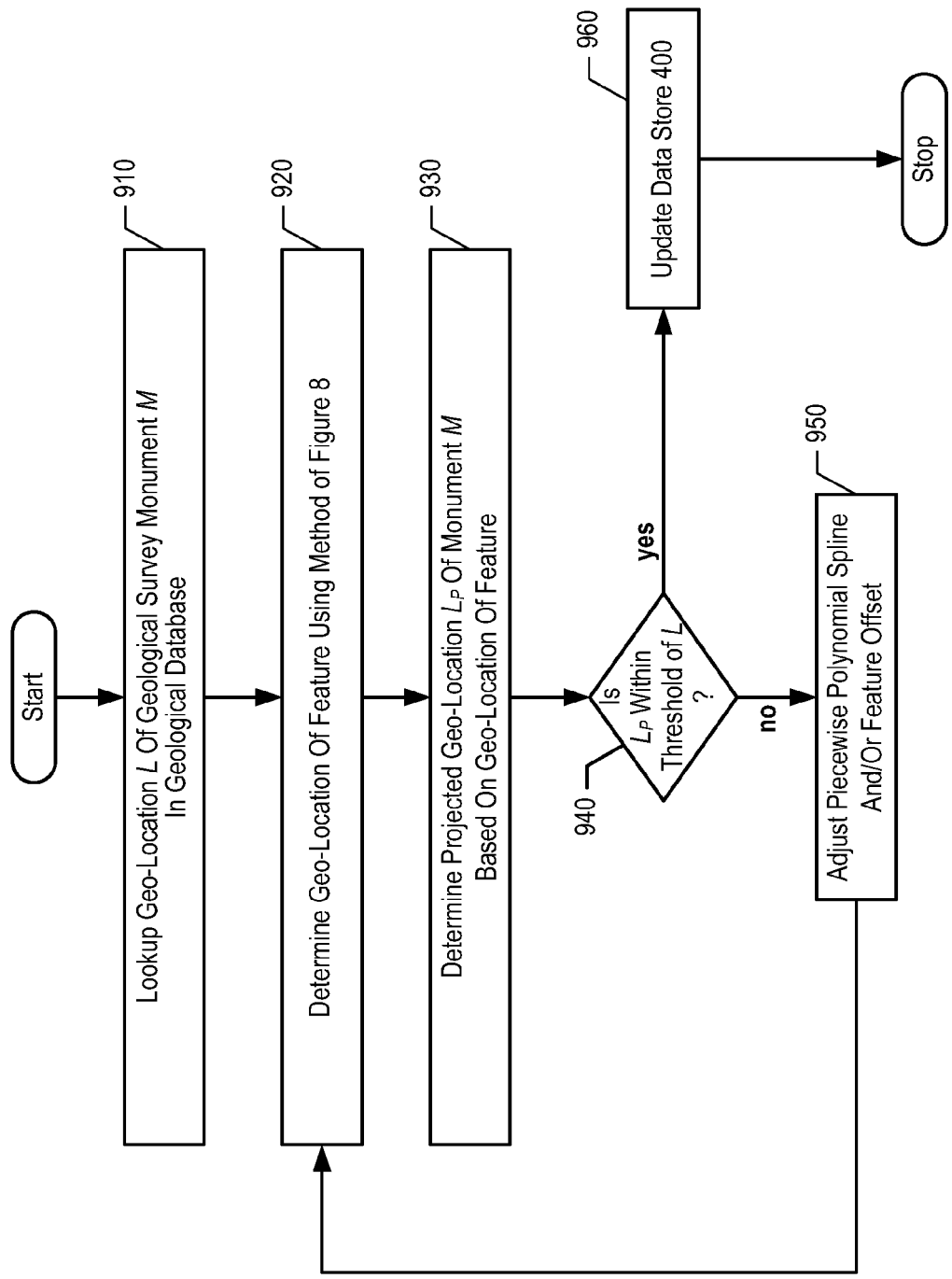
FIG. 9 depicts a flowchart of a first method for validating data store 400 against a geological database, in accordance with the illustrative embodiment of the present invention.

FIG. 9 depicts a flowchart of a first method for validating data store 400 against a geological database, in accordance with the illustrative embodiment of the present invention. It will be clear to those skilled in the art, after reading this disclosure, which tasks depicted in FIG. 9 can be performed simultaneously or in a different order than that depicted.

In the illustrative embodiment, a United States Geological Survey (USGS) database comprising the locations of survey monuments is employed as the geological database. As will be appreciated by those skilled in the art, some other embodiments of the present invention might employ a different geological database, and it will be clear to those skilled in the art, after reading this disclosure, how to validate data store 400 with such an alternative geological database.

At task 910, the geo-location L of a geological survey monument M in the geological database is looked up, in well-known fashion.

At task 920, the geo-location of a feature in data store 400 is determined using the method of FIG. 8.

At task 930, the projected geo-location $L_p$ of monument M is estimated based on the geo-location of the feature. As will be appreciated by those skilled in the art, projected geo-location $L_p$ might be estimated in a variety of ways (e.g., using a known heading and distance from the feature to monument M, etc.).

Task 940 checks whether projected geo-location $L_p$ is within a distance threshold of geo-location L. If not, execution proceeds to task 950, otherwise, execution continues at task 960.

At task 950, either one or both of piecewise polynomial spline 300 and the offset for the feature is adjusted in order to reduce the discrepancy between the actual geo-location of monument M and the projected geo-location of monument M based on the feature geo-location. As will be appreciated by those skilled in the art, adjustment of piecewise polynomial spline 300 might involve changes to track points, changes to one or more spline coefficients, or both. After task 950, the method of FIG. 9 continues back at task 920.

At task 960, data store 400 is updated accordingly based on the updated geometric data. After task 960, the method of FIG. 9 terminates.

As will be appreciated by those skilled in the art, the method of FIG. 9 can be performed for as many feature/monument pairs as desired.

Figure 10:
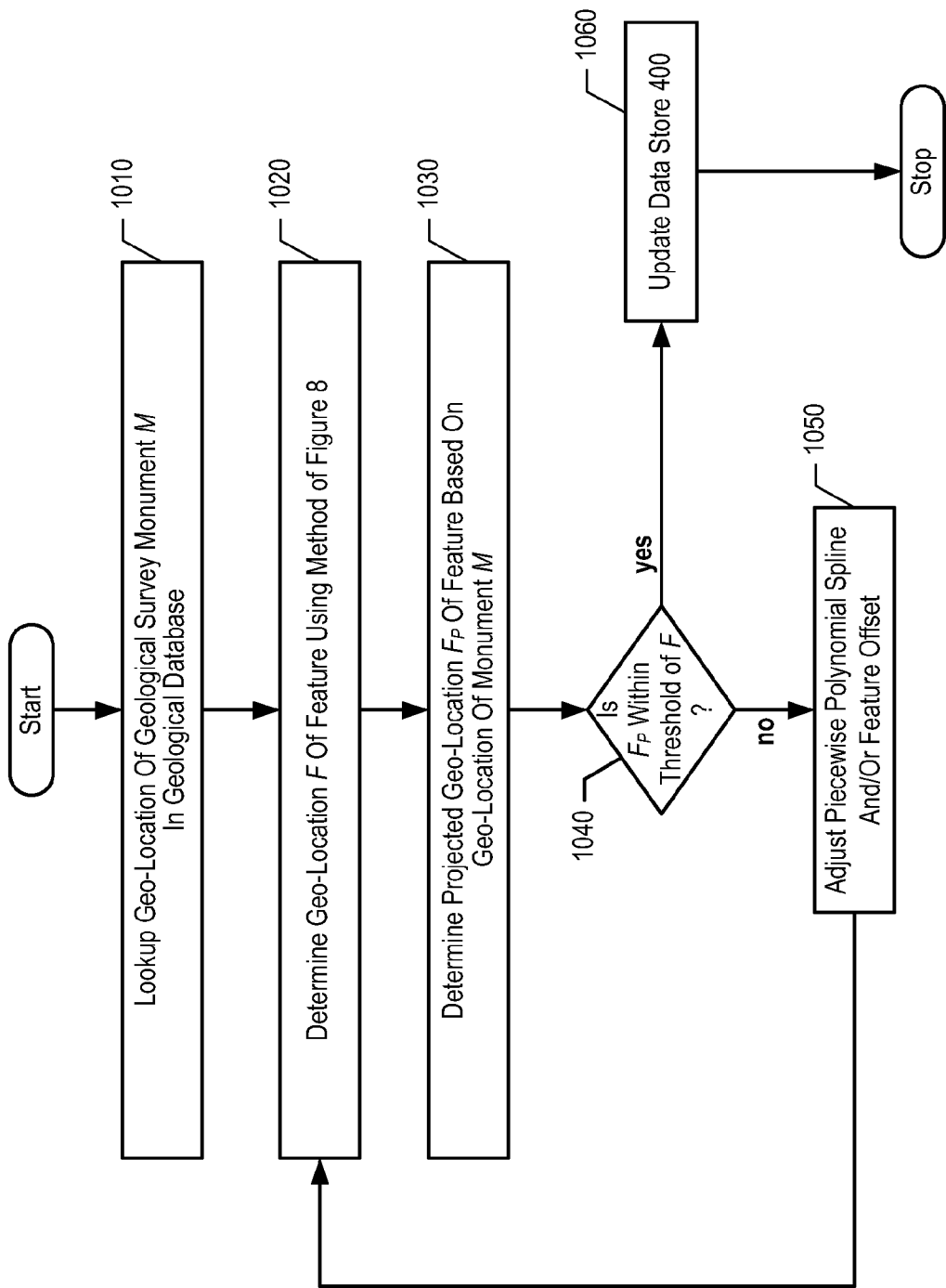
FIG. 10 depicts a flowchart of a second method for validating data store 400 against a geological database, in accordance with the illustrative embodiment of the present invention.

FIG. 10 depicts a flowchart of a second method for validating data store 400 against a geological database, in accordance with the illustrative embodiment of the present invention. It will be clear to those skilled in the art, after reading this disclosure, which tasks depicted in FIG. 10 can be performed simultaneously or in a different order than that depicted.

At task 1010, the geo-location of a geological survey monument M in the geological database is looked up, in well-known fashion.

At task 1020, the geo-location F of a feature in data store 400 is determined using the method of FIG. 8.

At task 1030, the projected geo-location $F_p$ of monument M is estimated based on the geo-location of monument M. As will be appreciated by those skilled in the art, projected geo-location $F_p$ might be estimated in a variety of ways (e.g., using a known heading and distance from monument M to the feature, etc.).

Task 1040 checks whether projected geo-location $F_p$ is within a distance threshold of geo-location F. If not, execution proceeds to task 1050, otherwise, execution continues at task 1060.

At task 1050, either one or both of piecewise polynomial spline 300 and the offset for the feature is adjusted in order to reduce the discrepancy between geo-location F and projected geo-location $F_p$. As will be appreciated by those skilled in the art, adjustment of piecewise polynomial spline 300 might involve changes to track points, changes to one or more spline coefficients, or both. After task 1050, the method of FIG. 10 continues back at task 1020.

At task 1060, data store 400 is updated accordingly based on the updated geometric data. After task 1060, the method of FIG. 10 terminates.

As will be appreciated by those skilled in the art, the methods of FIGS. 9 and 10 can be performed by a data-processing system (e.g., desktop computer, server, etc.) that comprises a memory (e.g., random-access memory, flash memory, a hard-disk, etc.) for storing the contents of data store 400 and a processor (e.g., a general-purpose microprocessor, a specialized processor, etc.). As will further be appreciated by those skilled in the art, checking the contents of data store 400 for conformance with the rules/constraints of feature rule base 405 can also be performed in well-known fashion by such a data-processing system.

Updating the Database

In accordance with the illustrative embodiment of the present invention, data in data store 400 is updated to reflect changes in feature geo-locations and track geometry due to track maintenance, as well as the addition of new features or removal of features during track maintenance.

Figure 11:
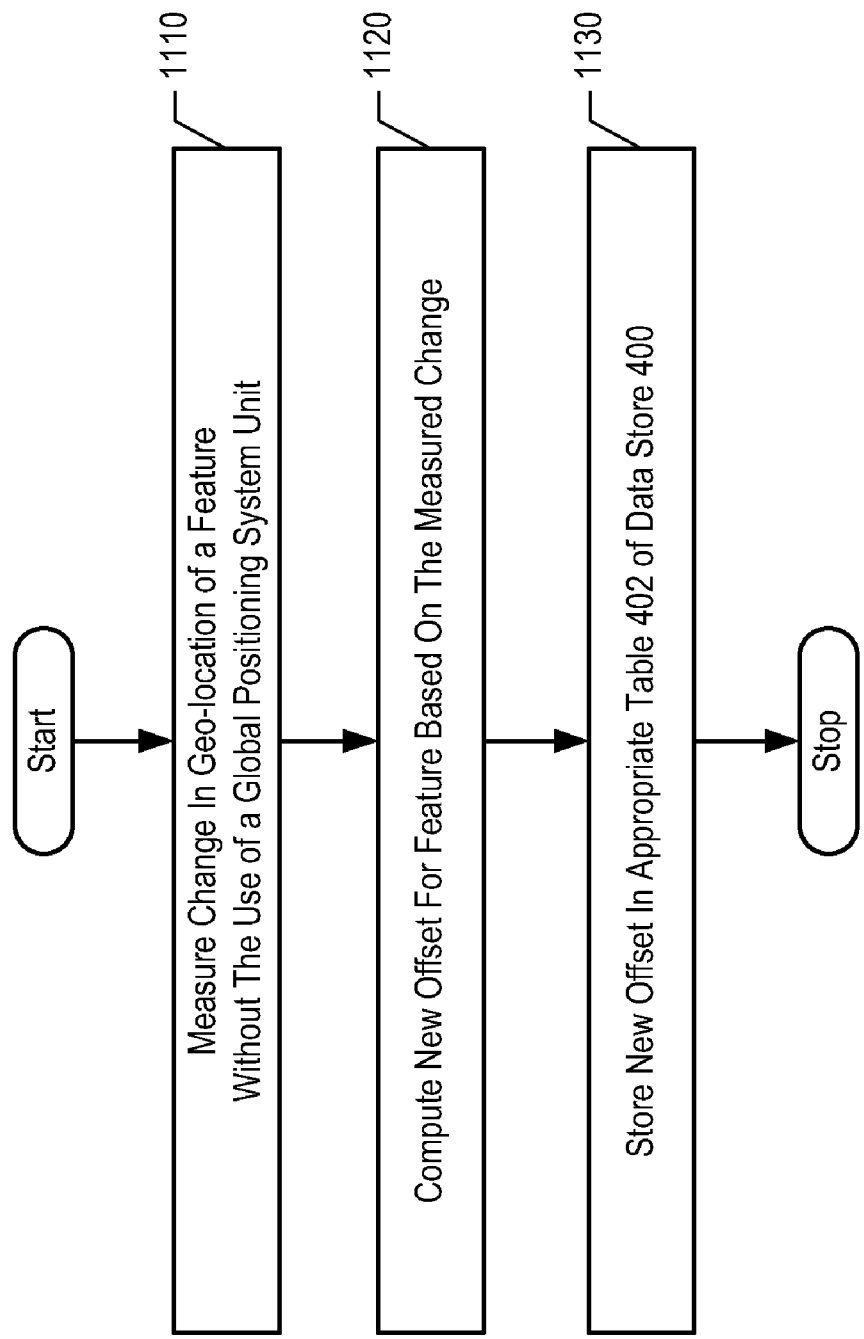
FIG. 11 depicts a flowchart of a first method for updating data store 400, in accordance with the illustrative embodiment of the present invention.

FIG. 11 depicts a flowchart of a first method for updating data store 400, in accordance with the illustrative embodiment of the present invention. The first method is for handling changes to the geo-location of one or more track features that result track maintenance. It will be clear to those skilled in the art, after reading this disclosure, which tasks depicted in FIG. 11 can be performed simultaneously or in a different order than that depicted.

At task 1110, a change in the geo-location of a feature is measured without the use of a Global Positioning System (GPS) unit (e.g., using a tape measure, using a laser rangefinder, etc.).

At task 1120, a new offset for the feature is computed based on the measured change.

At task 1130, the new offset is stored in the appropriate table 402 of data store 400, replacing the old offset. After task 1130, the method of FIG. 11 terminates.

Figure 12:
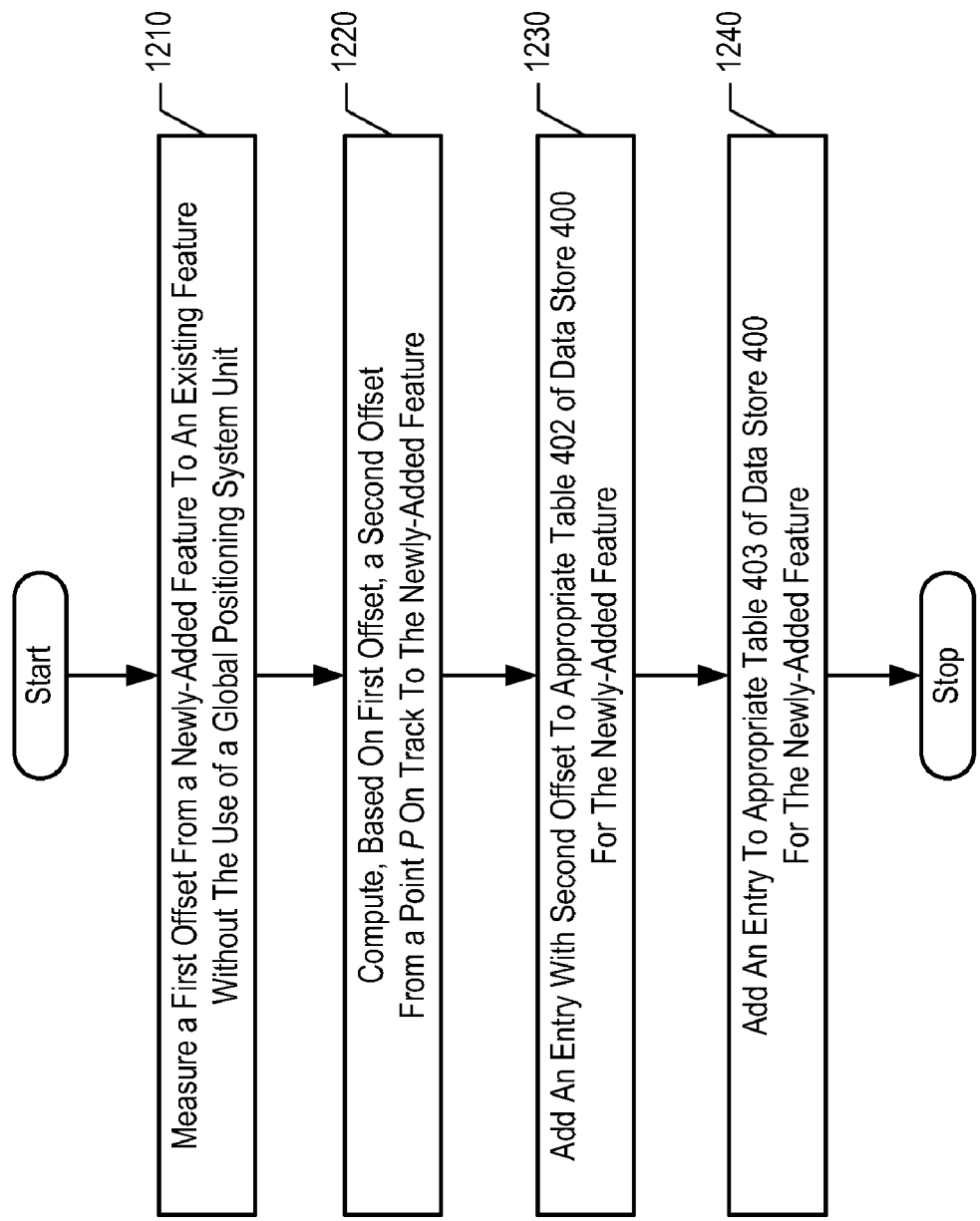
FIG. 12 depicts a flowchart of a second method for updating data store 400, in accordance with the illustrative embodiment of the present invention.

FIG. 12 depicts a flowchart of a second method for updating data store 400, in accordance with the illustrative embodiment of the present invention. The second method is for handling the addition of one or more new features to a track during maintenance. It will be clear to those skilled in the art, after reading this disclosure, which tasks depicted in FIG. 12 can be performed simultaneously or in a different order than that depicted.

At task 1210, a first offset from a newly-added feature to an existing feature is measured without the use of a Global Positioning System (GPS) unit (e.g., using a tape measure, using a laser rangefinder, etc.).

At task 1220, a second offset from a point P on the track to the newly-added feature is computed based on the first offset.

At task 1230, an entry comprising the second offset is added to the appropriate table 402 of data store 400 for the newly-added feature.

At task 1240, an entry is added to the appropriate table 403 of data store 400 for the newly-added feature. After task 1240, the method of FIG. 12 terminates.

As will be appreciated by those skilled in the art, when a feature is removed during track maintenance, then data store 400 can be updated simply by deleting the corresponding entry in appropriate table 402 and the corresponding entry in appropriate table 403.

Figure 13:
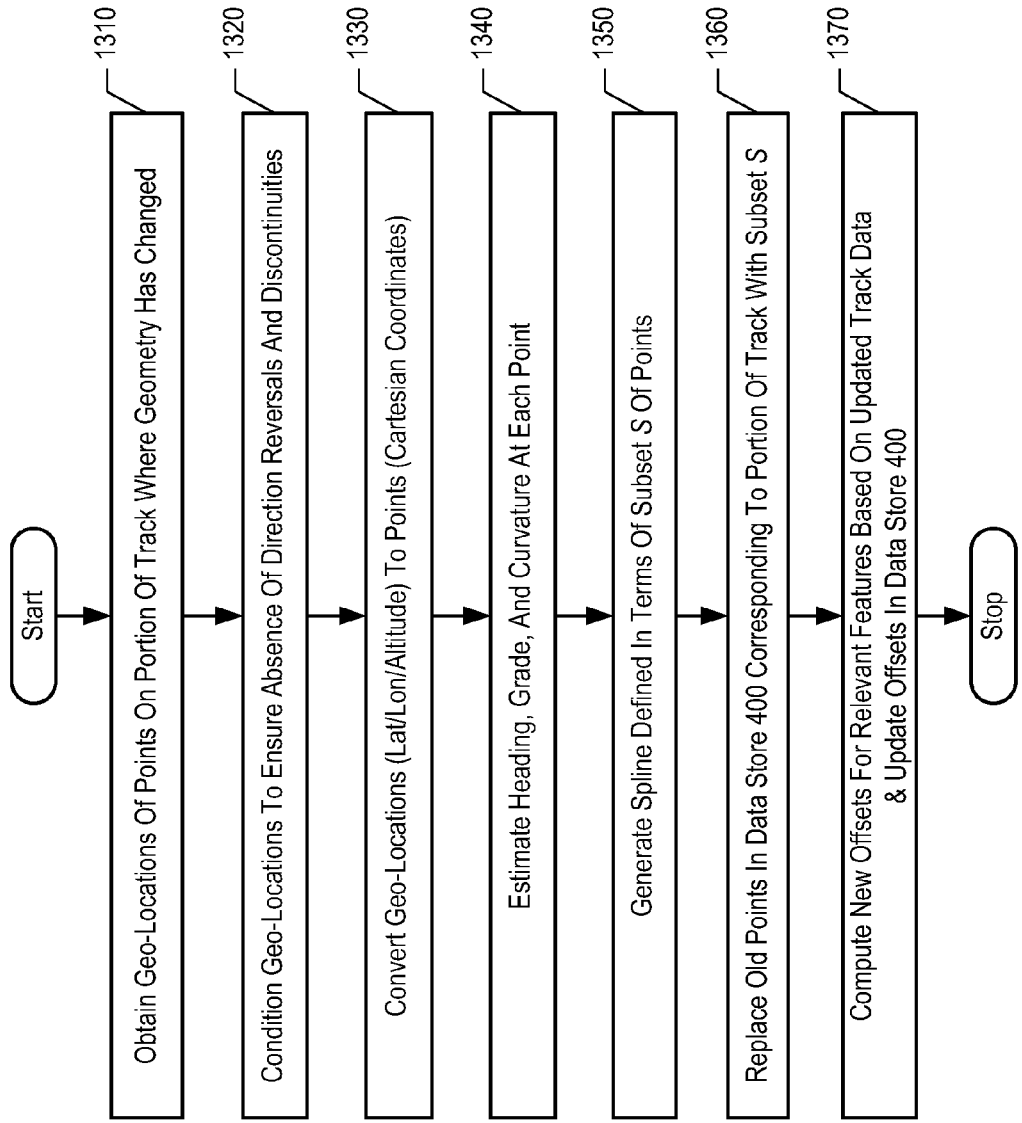
FIG. 13 depicts a flowchart of a third method for updating data store 400, in accordance with the illustrative embodiment of the present invention.

FIG. 13 depicts a flowchart of a third method for updating data store 400, in accordance with the illustrative embodiment of the present invention. The third method is for handling changes in the track geometry that result from maintenance. It will be clear to those skilled in the art, after reading this disclosure, which tasks depicted in FIG. 13 can be performed simultaneously or in a different order than that depicted.

At task 1310, geo-locations of points on the portion of track where the geometry has changed are obtained.

At task 1320, the geo-locations are conditioned to ensure the absence of direction reversals and discontinuities.

At task 1330, the geo-locations are converted from latitude/longitude/altitude to points expressed in Earth-Centered Earth-Fixed Cartesian coordinates, in well-known fashion.

At task 1340, the heading, grade, and curvature of the track are estimated at each of the points on the portion of track.

At task 1350, the relevant portion of piecewise polynomial spline 300 is re-generated based on a subset S of the new Cartesian-coordinate points.

At task 1360, old points in data store 400 corresponding to the portion of track are replaced with subset S.

At task 1370, new offsets for relevant features (i.e., those features along the track portion) are computed based on the updated track data, and the offsets stored in appropriate tables 402 of data store 400 are updated accordingly. After task 1370, the method of FIG. 13 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A computing method of updating a database that comprises a geometric representation of a train track and a plurality of offsets corresponding to the geo-locations of features on the train track, the method comprising:
converting, by a data-processing system, geo-locations of a first set of points on the train track from latitude/longitude/altitude coordinates to three-dimensional Earth-Centered Earth-Fixed Cartesian coordinates;
generating, by the data-processing system, based on the three-dimensional coordinates of the first set of points, a piecewise polynomial spline that is defined in terms of a proper subset S of the first set of points;
removing from the database entries corresponding to a second set of points on the train track; and
storing, by the database, new entries corresponding to the subset S, wherein each of the new entries comprises:
(i) three-dimensional Earth-Centered Earth-Fixed Cartesian coordinates,
(ii) an estimate of the heading of the train track,
(iii) an estimate of the grade of the train track, and
(iv) an estimate of the curvature of the train track;
wherein the geometric representation comprises a piecewise polynomial spline.

2. The method of claim 1 wherein the method is performed in response to maintenance of the train track.

3. The method of claim 1 further comprising conditioning the geo-locations to ensure the absence of direction reversals and discontinuities.

4. The method of claim 1 further comprising:
computing, based on the new entries in the database, a new offset for a feature on the train track; and
storing the new offset in the database.

5. The method of claim 1 wherein the feature is a traffic signal.

6. The method of claim 1 wherein the feature is a switch.

7. The method of claim 1 further comprising:
storing, by the database, a value V that is associated with a feature F on the train track, wherein the value V represents an offset from a point P on the train track, and wherein the offset corresponds to the geo-location of feature F,
computing, by the data-processing system, a new value V' for the feature F based on a change in the geo-location of the feature F, wherein the change is measured without the use of a Global Positioning System unit; and
storing, by the database, the new value V' as the offset for the feature F.

8. The method of claim 1 further comprising:
computing, by the data-processing system, a new value for a feature F based on a change in the geo-location of the feature F, wherein the new value represents an offset from a point P on the train track, and wherein the change is measured without the use of a Global Positioning System unit.

9. The method of claim 8 wherein the point P is in the subset S.

10. The method of claim 1 further comprising:
computing, by the data-processing system, based on a first offset, a second offset for a newly-added feature on the train track, wherein the first offset is from the newly-added feature to an existing feature on the train track, and is measured without the use of a Global Positioning System unit, and wherein the second offset is from a point P on the train track to the newly-added feature; and
storing, by the database, an entry for the newly-added feature, wherein the entry comprises the second offset.

11. A system comprising:
a database that comprises a geometric representation of a train track and a plurality of offsets corresponding to the geo-locations of features on the train track; and
a data-processing system that comprises a processor, wherein the data-processing system is operative to:
convert geo-locations of a first set of points on the train track from latitude/longitude/altitude coordinates to three-dimensional Earth-Centered Earth-Fixed Cartesian coordinates;
generate, based on the three-dimensional coordinates of the first set of points, a piecewise polynomial spline that is defined in terms of a proper subset S of the first set of points;
remove from the database entries corresponding to a second set of points on the train track; and
store, in the database, new entries corresponding to the subset S, wherein each of the new entries comprises:
(i) three-dimensional Earth-Centered Earth-Fixed Cartesian coordinates,
(ii) an estimate of the heading of the train track,
(iii) an estimate of the grade of the train track, and
(iv) an estimate of the curvature of the train track;
wherein the geometric representation comprises a piecewise polynomial spline.

12. The system of claim 11 wherein the updating of the database is performed in response to maintenance of the train track.

13. The system of claim 11 wherein the data-processing system is further operative to:
condition the geo-locations to ensure the absence of direction reversals and discontinuities.

14. The system of claim 11 wherein the data-processing system is further operative to:
compute, based on the new entries in the database, a new offset for a feature on the train track; and store the new offset in the database.

15. The system of claim 11 wherein the feature is a traffic signal.

16. The system of claim 11 wherein the feature is a switch.

17. The system of claim 11 wherein the data-processing system is further operative to:
   store, in the database, a value V that is associated with a feature F on the train track, wherein the value V represents an offset from a point P on the train track, and wherein the offset corresponds to the geo-location of feature F;
   compute a new value V' for the feature F based on a change in the geo-location of the feature F, wherein the change is measured without the use of a Global Positioning System unit; and
   store, in the database, the new value V' as the offset for the feature F.

18. The system of claim 11 wherein the data-processing system is further operative to:
   compute a new value for a feature F based on a change in the geo-location of the feature F, wherein the new value represents an offset from a point P on the train track, and wherein the change is measured without the use of a Global Positioning System unit.

19. The system of claim 18 wherein the point P is in the subset S.

20. The system of claim 11 wherein the data-processing system is further operative to:
   compute, based on a first offset, a second offset for a newly-added feature on the train track, wherein the first offset is from the newly-added feature to an existing feature on the train track, and is measured without the use of a Global Positioning System unit, and wherein the second offset is from a point P on the train track to the newly-added feature; and
   store, in the database, an entry for the newly-added feature, wherein the entry comprises the second offset.

* * * * *